Feb. 1, 1938.  J. A. STEIN ET AL  2,106,772
PRESSURE RECORDING APPARATUS AND METHOD.
Filed July 29, 1936  2 Sheets-Sheet 1
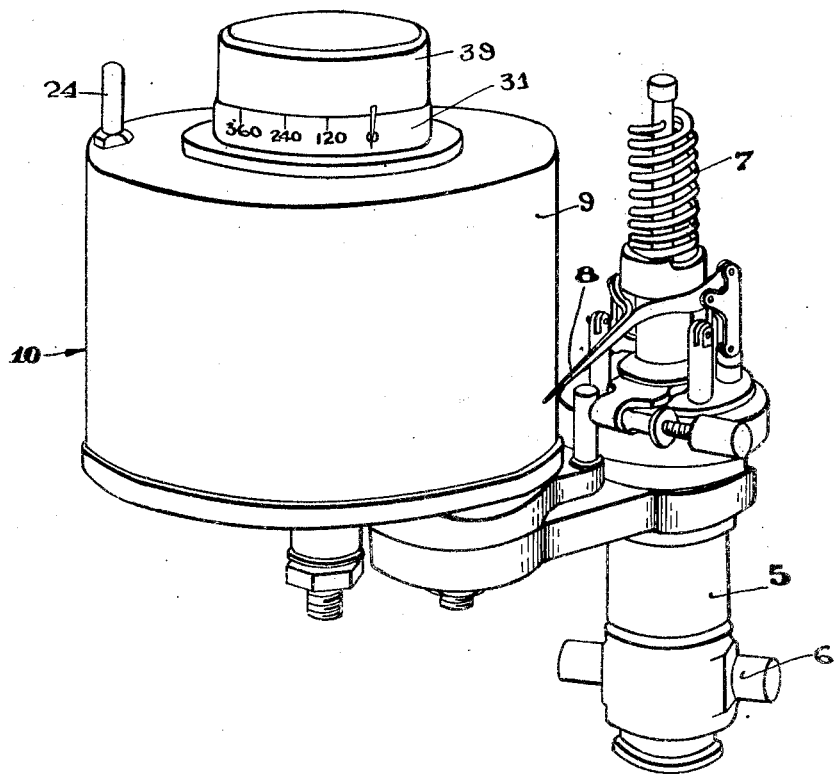
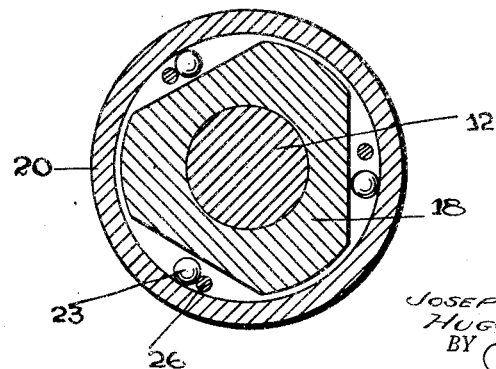
INVENTORS
JOSEPH A. STEIN AND
HUGO F. SEMRAU
BY James C. Bradley
ATTORNEY.

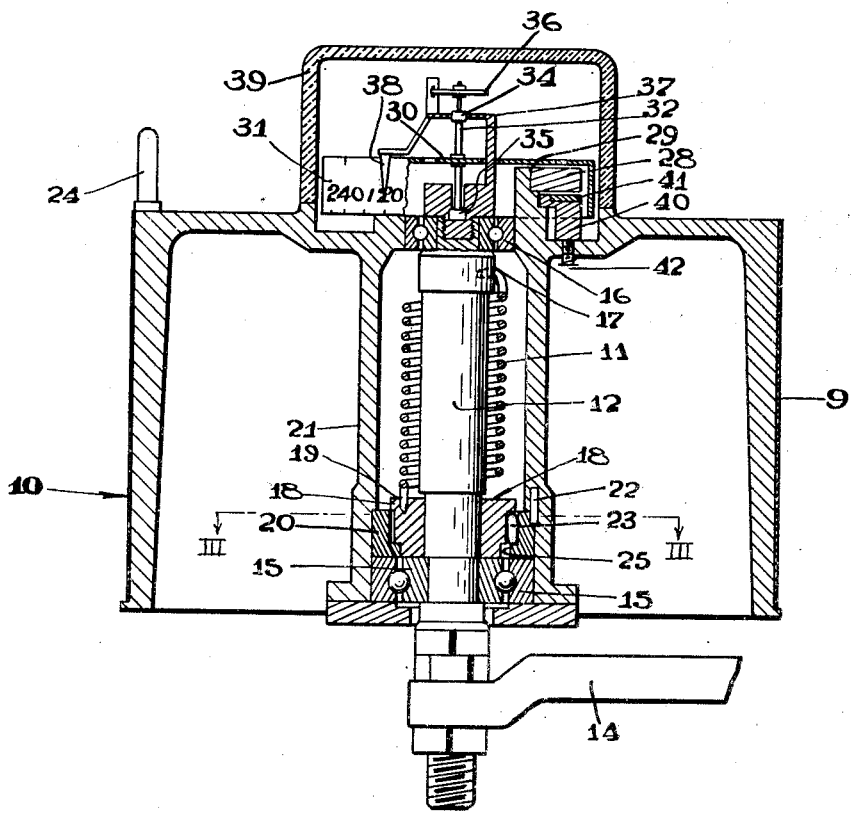
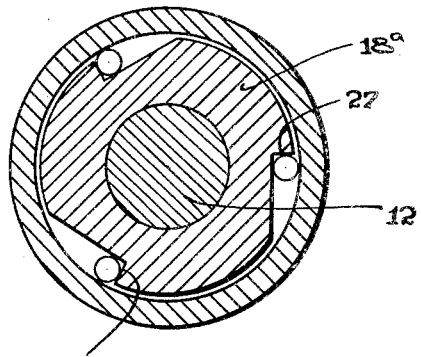

Patented Feb. 1, 1938

2,106,772

UNITED STATES PATENT OFFICE 2,106,772

PRESSURE RECORDING APPARATUS AND METHOD

Joseph A. Stein, Pittsburgh, and Hugo F. Semrau, Rosedale, Pa., assignors to Bacharach Industrial Instrument Company, a corporation of Pennsylvania Application July 29, 1936, Serial No. 93,304

6 Claims. (Cl. 234—70)

The present invention relates to pressure measuring apparatus and its method of use, and more particularly to that portion of the apparatus and method used in obtaining a record of the pressure variations, such as is present in an engine cylinder in relation to the stroke of the piston. One of the primary objects of the invention is the provision of an inexpensive and simple device for obtaining a record having a measured and predetermined time base over a wide range which is unrestrictedly variable within the limits of the range without the use of a clockwork or motor drive. A further object is the provision of a cheap simple device for imparting to the drum of the device the necessary velocity.

The present device is of the type in which the drum is driven in one direction and is known as a "pressure time drum". Such drums may be, and are, driven independently of the engine, as it is merely necessary that the drum shall spin at a rate such that the abscissa of the diagram is sufficiently extended, when interpreted in terms of time or crank angle degrees, that the cyclic pressure changes and the rate of change can be readily observed and analyzed. Pressure time drums, as heretofore proposed, either employ more or less expensive and complicated clock work mechanism to drive them or an electric motor drive for the drum, which latter requires connection to a proper power source (often unavailable) and is of questionable value in providing constant speed unless a relatively large and expensive motor of the synchronous type is employed.

The time drum hereinafter described, around which the present invention centers, avoids the requirement of clock work and electric motor drives, thus avoiding the expense and inherent disadvantages incident to such drives. Briefly stated, the present invention involves the substitution for the drives heretofore used, of a simple and inexpensive means for giving the drum a vigorous spinning impetus, and then allowing it to rotate due to its inertia during the period in which the stylus of the pressure device is being applied, the drum being equipped with a speed indicating or metering device which guides the operator as to the proper moment to apply the stylus. Since the drum spins at a gradually decreasing speed, the operator can take his record on any predetermined time base over a wide range.

In its preferred form, the applicants' device employs a spring, in which energy is stored by winding, for giving the drum its starting impetus, and after such impetus, the spring is disconnected automatically from the drum, so that the drum is free to rotate of its own inertia without being subject to retardation by the spring after attaining a maximum velocity of rotation. It will be understood however that any other suitable means might be employed to give the drum its starting impetus and that it might be given such impetus directly by manual means. One form of the apparatus is shown in the accompanying drawings, wherein:

Figure 1 is a perspective view of the complete apparatus. Fig. 2 is a vertical section through the drum. Fig. 3 is a section through the clutch on the line III—III of Fig. 2. And Fig. 4 is a section showing a modification of the clutch structure of Fig. 3.

Referring to the drawings, 5 is the casing of the pressure cylinder adapted to be connected by the coupling 6 to a pipe leading to one of the engine cylinders whose pressure is to be measured and recorded. Working in this cylinder is a plunger which operates against the pressure of the spring 7 and moves the stylus or marker 8 over the removable paper cylinder 9 on the record or time drum 10. The stylus is supported in the usual way so that its marking point may be moved toward and from the drum permitting it to be applied only when the moment arrives to take the record, as later explained. The apparatus to this point is of conventional form well known in the art, so that any detailed description of the mechanism or its functioning is unnecessary.

Referring to Fig. 2, the drum 10 is of substantially large diameter and inertia, and provision is made for imparting a spinning movement thereto in the form of the spring 11 which is coiled around the shaft 12 rigidly secured at its lower end to the bracket 14. The drum is mounted for rotation on the shaft on the ball bearings 15 and 16. The upper end of the spring is attached to the shaft 12, as indicated at 17, while the lower end thereof is attached to the inner member 18 of a one-way or over-running clutch, as indicated at 19. The outer member 20 of the clutch is secured non-rotatably to the hub 21 of the drum by any suitable means, such as the pin 22. The rollers 23 provide the locking means between the clutch members, as indicated in Fig. 3, the sides of the member 18 being cut away to provide the wedge spaces. When the drum is turned in a clockwise direction (Fig. 3) by the handle 24 (Fig. 2) one or more of the rollers (supported on the flange 25) move to the position shown for the single roller lying to the right in Fig. 3, so that the member 18 turns with the drum and clutch member 20, and winds up the spring 11. The degree to which the spring may be tightened may be regulated by the proper selection of the shaft diameter at the section where the spring winds on the shaft, since the spring diameter grows smaller as it is wound.

When the handle 24 of the drum is released, the spring operating through the clutch gives the drum a vigorous spinning movement in a counterclockwise (Fig. 3) direction. When the energy of the spring is released to a point where it no longer tends to drive the drum, but rather to retard it, the drum and clutch member 20 move in a counterclockwise direction with respect to the inner clutch member 18 and the rollers are carried out of clutching position and against stop pins 26 carried by the member 18 as indicated by the two rollers lying to the left in Fig. 3. This leaves the drum free to continue its spinning movement. It will be understood in this connection that any form of over-running or one-way clutch may be used intermediate the drum and spring in order to free the drum from the spring after the drum has attained its maximum speed of rotation, an alternative structure being shown in Fig. 4 in which the shoulders 27 on the clutch member 18a perform the function of the pins 26.

In order to guide the operator in applying the stylus to the drum when its gradually reducing peripheral speed reaches the predetermined point at which it is desired to take the record, the speed indicating device shown at the upper end of the drum in Fig. 2 is provided. This speed indicator is of the type used in automobiles and is well known in the speed indicator art. It will be understood that this particular indicator constitutes no part of the present invention and that any other suitable design may be substituted. Secured to the upper end of the drum hub is a circular magnet 28. This magnet is locked in position on the drum hub by any suitable means, such as being forced over the shoulder 29. A thin metal speed cup 30, the edge 31 of which is suitably marked and calibrated and mounted on the spindle 32, is positioned with respect to the magnet 28 so that the magnetic flux permeates the cup. The spindle 32 carrying the cup is held by the bearings 34 and 35. The speed cup is restrained from rotating, due to the drag of the magnetic flux or field which field rotates as the drum rotates by a spiral spring 36 fastened between the cup and its supporting bracket 37, such bracket being locked to the drum shaft 12. A stationary index 38 supported by the bracket 37 extends over the scale of the speed cup. Thus, as the drum rotates, the drag of the rotating magnetic field tends to turn the speed cup against its spring 36, and the faster the drum rotates, the further the speed cup is deflected. The index 38 facilitates reading directly the drum peripheral speed from the scale on the speed cup. A transparent window 39 protects the speed indicator mechanism from damage. To facilitate calibration of the speed cup indicator, an adjustable magnetic by-pass 40 is provided which varies the strength of the magnetic field of the magnet 28 by the well known expedient of interposing a steel strip 41 of adjustable permeability across the space separating the poles of the magnet. This steel strip is adjustable and locked by the screw 42.

In operating the device, the spring 11 is wound by rotating the drum 9 through its handle 24, after which the handle is released. The energy of the spring operating through the clutch now gives the drum a spinning impetus, and when the drum reaches a maximum speed of rotation and the spring a point of release where it tends to retard the drum, the clutch lets go and the drum spins freely at a gradually decreasing speed. When the speed reduces to a predetermined point, as indicated by the graduations on the speed cup beneath the pointer or index 38, the operator presses the stylus or marker 8 against the paper on the drum and thus secures a record. The speed of rotation of the drum is of course decreasing during the taking of the record, but this decrease is so gradual and the time period in making the record is so short, that for practical purposes the record is subject to the same analysis as if the speed were constant and at the rate shown by the indicator at the moment the stylus is applied to the paper. The method and drive as described and illustrated has, in addition to a lower cost figure and greater reliability as compared with clock work and other motor drives, the advantage of a speed range which is as wide as may be desired and which is unrestrictedly variable. The device thus has a flexibility of operation which can not be approximated by the use of clock work or other power devices which apply a continuous drive to the drum.

What we claim is:

1. In apparatus for recording pressure fluctuations, a pressure operated marking device, a record receiving drum in position to be engaged by the marking device, means whereby a spinning impetus may be given to the drum but which leaves it free therefrom, after such impetus, to rotate at decreasing speed under its own inertia, and means connected to the drum for indicating the proper peripheral speed of rotation thereof for application of the marking device.

2. In apparatus for recording pressure fluctuations, a record receiving drum, a spring in operative relation with respect to the drum whereby the drum may be given a movement of rotation at a high speed when the energy stored in the spring is released, and a releasable connection between the spring and drum which automatically frees the drum from the spring when the drum attains a speed at which it tends to run ahead of the driving effect of the spring.

3. In apparatus for recording pressure fluctuations, a record receiving drum, a spring in operative relation with respect to the drum whereby the drum may be given a movement of rotation at a high speed when the energy stored in the spring is released, and an over-running clutch connection between the drum and spring which frees the drum from the spring when the spring has discharged its energy to an extent where it tends to retard the movement of the drum.

4. In apparatus for recording pressure fluctuations, a record receiving drum, a coil spring in the drum which is fixed at one end, an over-running clutch member secured to the drum, and a second over-running clutch member to which the other end of the spring is secured, so that the turning of the drum in one direction winds up the spring, but leaves the drum free to rotate independently of the spring in the reverse direction after the speed of rotation of the drum is such that the spring would otherwise tend to retard it.

5. A method of operating the record receiving drum of a pressure indicator, which consists in spinning the drum at a high rate of speed by the application thereto of a driving means, releasing the drum from the driving means so that it rotates by virtue of its momentum, measuring the decreasing peripheral speed of the drum, and applying to the periphery of the drum a marker operated by the pressure to be measured when such peripheral speed reaches a predetermined point.

6. A method of manipulating the record re-receiving drum of a pressure indicator, which consists in giving it an impetus so that it spins freely, leaving the drum free to rotate by its own momentum at a gradually decreasing speed, measuring the decreasing peripheral speed of the drum, and applying to the periphery of the drum a marker governed by the pressure to be measured when such peripheral speed reaches a predetermined point.

J. A. STEIN.
HUGO F. SEMRAU.